US012406513B2

(12) United States Patent
Lin et al.

(10) Patent No.: US 12,406,513 B2
(45) Date of Patent: Sep. 2, 2025

(54) AUTOMATIC SCORING METHOD AND SYSTEM TO OUTPUT A TEST SCORE BASED ON A COMPARISON OF A CURRENT TEST PAPER IMAGE AND A REFERENCE TEST PAPER IMAGE WHEN DETERMINING A SCRIPT COLOR IS A DESIGNATED SCRIPT COLOR

(71) Applicant: AVER INFORMATION INC., New Taipei (TW)

(72) Inventors: Chen Lin, New Taipei (TW); Yun-Long Sie, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 339 days.

(21) Appl. No.: 18/136,309

(22) Filed: Apr. 18, 2023

(65) Prior Publication Data

US 2023/0343120 A1    Oct. 26, 2023

(30) Foreign Application Priority Data

Apr. 20, 2022    (TW) .................................. 111114955

(51) Int. Cl.
   *G06V 30/418*    (2022.01)
   *G06Q 50/20*    (2012.01)
   *G06V 30/148*    (2022.01)

(52) U.S. Cl.
   CPC .......... *G06V 30/153* (2022.01); *G06Q 50/20* (2013.01); *G06V 30/418* (2022.01)

(58) Field of Classification Search
   CPC .... G06Q 50/20; G06V 30/153; G06V 30/418; G06V 30/1444; G06V 30/1448; G06V 30/1473; G06V 30/18019; G06V 30/192; G06V 30/194; G06V 30/196; G06V 30/198

(Continued)

(56) References Cited

U.S. PATENT DOCUMENTS 10,255,494 B2 *   4/2019   Nakamura ............. G06V 30/32
11,508,251 B2 *  11/2022   He .......................... G06N 3/045

(Continued)

FOREIGN PATENT DOCUMENTS

| CN | 105760869 A | 7/2016 |
| CN | 106709492 A | 5/2017 |
| CN | 108932508 A | 12/2018 |

*Primary Examiner* — Chad Dickerson
(74) *Attorney, Agent, or Firm* — Maschoff Brennan (57) ABSTRACT

An automatic scoring method, performed by a processing device, includes: obtaining a current test paper image, wherein a hand-writing script on the current test paper image has a script color; determining whether the script color is a designated color; determining whether a database stores a reference text string if the script color is not the designated color; aligning the current test paper image with a reference test paper image corresponding to the reference text string and using reference coordinates to compare the current test paper image with the current test paper image to output a test score when the database stores the reference text string; and identifying the hand-writing script to store an identification result as the reference text string and storing position coordinates of the hand-writing script on the current test paper image as the reference coordinates if the script color is the designated color.

8 Claims, 6 Drawing Sheets

(58) Field of Classification Search
USPC ......................................................... 382/177
See application file for complete search history.

(56) References Cited

U.S. PATENT DOCUMENTS

| | | | |
|---|---|---|---|
| 2008/0227075 A1* | 9/2008 | Poor .................... | G06V 30/224 |
| | | | 434/307 R |
| 2015/0187219 A1* | 7/2015 | Sheppard ................ | G09B 3/06 |
| | | | 434/354 |

* cited by examiner

AUTOMATIC SCORING METHOD AND SYSTEM TO OUTPUT A TEST SCORE BASED ON A COMPARISON OF A CURRENT TEST PAPER IMAGE AND A REFERENCE TEST PAPER IMAGE WHEN DETERMINING A SCRIPT COLOR IS A DESIGNATED SCRIPT COLOR

CROSS-REFERENCE TO RELATED APPLICATIONS

This non-provisional application claims priority under 35 U.S.C. § 119(a) on Patent Application No(s). 111114955 filed in Taiwan (ROC) on Apr. 20, 2022, the entire contents of which are hereby incorporated by reference.

BACKGROUND

1. Technical Field

This disclosure relates to an automatic scoring method and system.

2. Related Art

In order to speed up the scoring of a test paper and improve the accuracy of scoring, electronic test papers have become a common practice in the market. However, if electronic test papers are used for test, each examinee needs to be equipped with a computer or a smart phone, which is a huge hardware cost for educational institutions with insufficient resources. If answering sheets and test scanners are used for scoring the test papers, high costs for hardware purchase and maintenance are required. Further, in addition to the test paper itself, an additional answering sheet needs to be consumed for each test paper, which is not environmental friendly.

SUMMARY

Accordingly, this disclosure provides an automatic scoring method and system.

According to one or more embodiment of this disclosure, an automatic scoring method, performed by a processing device, includes: obtaining a current test paper image, wherein a hand-writing script on the current test paper image has a script color; determining whether the script color is a designated color; determining whether a database stores a reference text string if the script color is not the designated color; aligning the current test paper image with a reference test paper image corresponding to the reference text string and using reference coordinates to compare the current test paper image with the current test paper image to output a test score when the database stores the reference text string; and identifying the hand-writing script to store an identification result as the reference text string and storing position coordinates of the hand-writing script on the current test paper image as the reference coordinates if the script color is the designated color.

According to one or more embodiment of this disclosure, an automatic scoring system includes: a database, a photographing device and a processing device. The photographing device is configured to capture a current test paper image and outputting the current test paper image, wherein a hand-writing script on the current test paper image has a script color. The processing device is connected to the database and the photographing device, and is configured to obtain the current test paper image, determine whether the script color is a designated color, determine whether the database stores a reference text string if the script color is not the designated color, align the current test paper image with a reference test paper image corresponding to the reference text string and use reference coordinates to compare the current test paper image with the current test paper image to output a test score when the database stores the reference text string, and identify the hand-writing script to store an identification result as the reference text string and store of position coordinates of the hand-writing script on the current test paper image as the reference coordinates if the script color is the designated color.

In view of the above description, the automatic scoring method and system according to one or more embodiments of the present disclosure may lower the costs for hardware purchase and maintenance of test scanners, and since the examinee does not need to fill out answers using additional answering sheet, the above embodiments may be more environmental friendly. In addition, the automatic scoring method and system according to one or more embodiments of the present disclosure may improve the efficiency of scoring the test papers. That is, people (such as teachers) scoring the test papers may not need to compare the answers one by one; instead, they may determine the test score in a faster way by placing the test paper in front of the photographing device to determine the test score, and errors caused by manually scoring the test papers may be alleviated.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
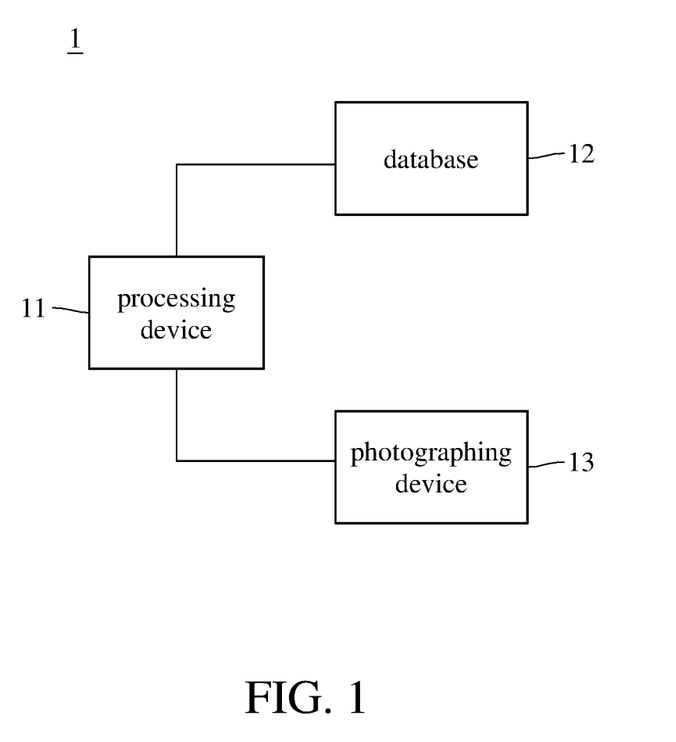
FIG. 1 is a block diagram illustrating an automatic scoring system according to an embodiment of the present disclosure.

Please refer to FIG. 1, wherein FIG. 1 is a block diagram illustrating an automatic scoring system according to an embodiment of the present disclosure. The automatic scoring system 1 of the present disclosure may include a processing device 11, a database 12 and a photographing device 13. The processing device 11 may be electrically connected to or in communication connection with the database 12 and the photographing device 13.

The processing device 11 may be a central processing unit, a programmable logic device or an application specific integrated circuit (ASIC) etc. The database 12 may be disposed in a memory, wherein the memory may be a non-volatile memory, such as a read-only memory (ROM) or a flash memory etc. In the embodiment of FIG. 1, the database 12 may be built in a memory external to the processing device 11; and in another embodiment that is not illustrated, the database 12 may be built in a built-in memory of the processing device 11. The photographing device 13 may be a device used for taking static images, such as for taking images of test papers.

The processing device 11 is configured to identify a color of a hand-writing on a test paper image captured by the photographing device 13. If the identification result does not show the color of the hand-writing being a designated color indicating correct answers, the processing device 11 may compare the identification result with a text string representing the correct answers, or may store the test paper image into the database 12 temporarily; and if the identification result shows the color of the hand-writing being the designated color, the processing device 11 may further identify the hand-writing on the test paper image to generate the text string representing the correct answers.

Figure 2:
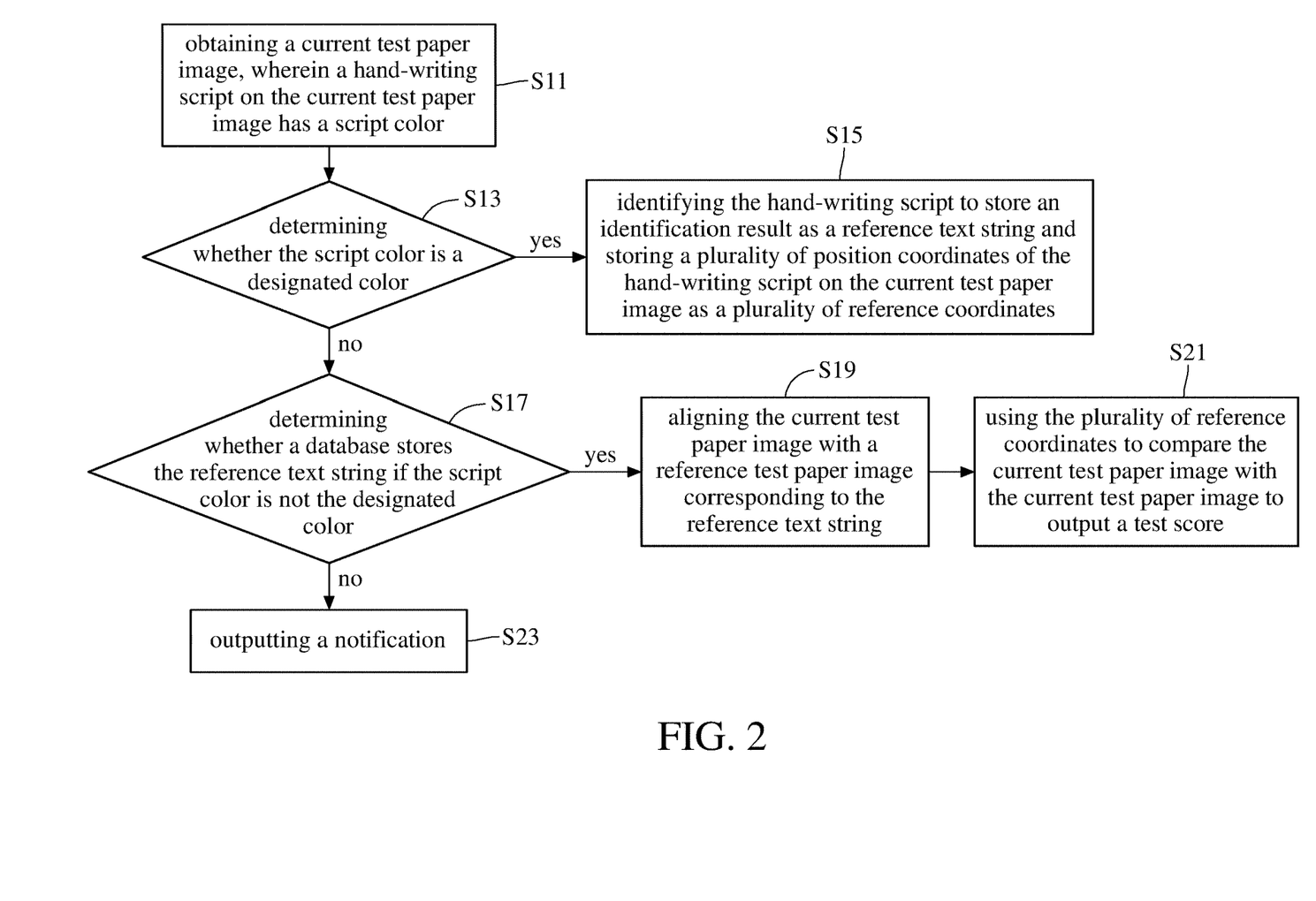
FIG. 2 is a flowchart illustrating an automatic scoring method according to an embodiment of the present disclosure.
Figure 3:
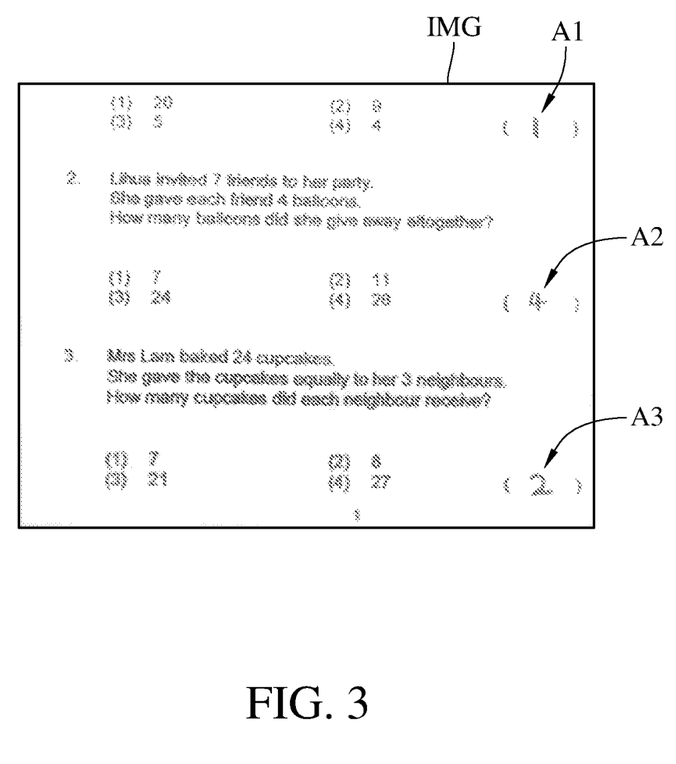
FIG. 3 illustrates a schematic diagram of a test paper image.

To explain the above content in more detail, please refer to FIG. 1, FIG. 2 and FIG. 3, wherein FIG. 2 is a flowchart illustrating an automatic scoring method according to an embodiment of the present disclosure, and FIG. 3 illustrates a schematic diagram of a test paper image. The automatic scoring method of the present disclosure may be performed by the automatic scoring system 1 of FIG. 1. Further, the automatic scoring method of the present disclosure may be performed by the processing device 11 of the automatic scoring system 1.

The automatic scoring method of the present disclosure, as shown in FIG. 2, may include: step S11: obtaining a current test paper image, wherein a hand-writing script on the current test paper image has a script color; step S13: determining whether the script color is a designated color; when the determination result of step S13 is "yes", performing step S15: identifying the hand-writing script to store an identification result as a reference text string and storing a plurality of position coordinates of the hand-writing script on the current test paper image as a plurality of reference coordinates; when the determination result of step S13 is "no", performing step S17: determining whether a database stores the reference text string if the script color is not the designated color; when the determination result of step S17 is "yes", performing step S19: aligning the current test paper image with a reference test paper image corresponding to the reference text string; step S21: using the plurality of reference coordinates to compare the current test paper image with the current test paper image to output a test score; and when the determination result of step S17 is "no", performing step S23: outputting a notification. Step S23 of FIG. 1 may be selectively performed. That is, when the determination result of step S17 is "no", the automatic scoring method may be ended without further operations.

In step S11 and step S13, the processing device 11 obtains the current test paper image IMG from the photographing device 13, and identifies the script color of the hand-writing scripts A1-A3 on the current test paper image by, for example RGB color channel, to determine whether the script color is the designated color. As described above, the designated color is a color used to indicate correct answers, such as the color red, the present disclosure does not limit the specific color of the designated color. For example, if the determination result of step S13 is "yes", it means that the hand-writing scripts A1-A3 on the current test paper image IMG are correct answers. If the determination result of step S13 is "no", it means that the hand-writing scripts A1-A3 on the current test paper image IMG are likely answers filled out by the examinee.

When the processing device 11 determines that the script color is the designated color in step S13, the current test paper image IMG may be used as the reference test paper image. Therefore, in step S15, the processing device 11 performs hand-writing identification on the hand-writing scripts A1-A3 on the current test paper image IMG to store the identification result as the reference text string, and store a plurality of position coordinates of the hand-writing scripts A1-A3 on the current test paper image IMG as the reference coordinates. The reference text string is a string formed by sequentially connecting the correct answers, such as formed by connecting the correct answers based on question numbers on the current test paper image IMG. Take FIG. 3 as an example, when the determination result of step S13 is the script color of the hand-writing scripts A1-A3 being the designated color, then in step S15, the reference text string may be "1-4-2", and the reference coordinates may be the position coordinates of the hand-writing scripts A1-A3 on the current test paper image IMG.

Further, in step S15, the processing device 11 may extract a plurality of reference blocks from the current test paper image IMG, wherein the reference blocks are blocks circling the hand-writing scripts A1-A3. The reference blocks preferably have the same size, such as the size of 28 pixels×28 pixels. The processing device 11 may perform image processing on the current test paper image IMG to store the reference coordinates of the hand-writing scripts A1-A3 on the current test paper image IMG. For the image processing, the processing device 11 may be configured to find contours of the hand-writing scripts A1-A3, and store the position coordinates of the pixels of the contours as the reference coordinates. Therefore, in step S15, the processing device 11 may input the reference blocks with the same size into an artificial neural network model to recognize the hand-writing scripts A1-A3 to generate the identification result of 1, 4 and 2, and thereby storing the identification result as the reference text string of "1-4-2". A person ordinarily skilled in the art can understand that the artificial neural network model may be a model trained based on data stored in the built-in database of the processing device 11. For example, various target images (such as images with hand-writings) may be collected in advance, these target images are used as input layers, and a model used to determine a target (hand-writing) may be obtained by artificial neural network training. The artificial neural network is, for example, a convolutional neural network (CNN), a recurrent neural network (RNN) and a deep neural network (DNN).

When the processing device 11 determines that the script color is not the designated color in step S13, then in step S17, the processing device 11 further determines whether the reference text string is already stored in the database 12. In other words, when the determination result of step S13 is "no", it means that the current test paper image IMG is a test paper filled out by an examinee. Therefore, the processing device 11 further determines whether correct answers (the reference text string) for calculating the test score are already stored in the database 12.

When the processing device 11 determines that the reference text string is already stored in the database 12 in step S17, it means that the database 12 already stores the reference text string previously obtained from the reference test paper image. Therefore, in step S19, the processing device 11 aligns the reference test paper image with the current test paper image IMG. Then, in step S21, the processing device 11 finds the hand-writing script located at the reference coordinates in the current test paper image IMG to compare the hand-writing script on the current test paper image IMG with the hand-writing script on the reference test paper image, to calculate and output the test score corresponding to the current test paper image IMG. When the processing device 11 determines that no reference text string is stored in the database 12 in step S17, then in step S23, the processing device 11 may output a notification to a display device connected thereto to remind the user that the reference test paper image having the correct answers should be provided. Accordingly, costs for hardware purchase and maintenance may be lowered, and since the examinee does not need to fill out answers using additional answering sheet, the above embodiments may be more environmental friendly.

Figure 4:
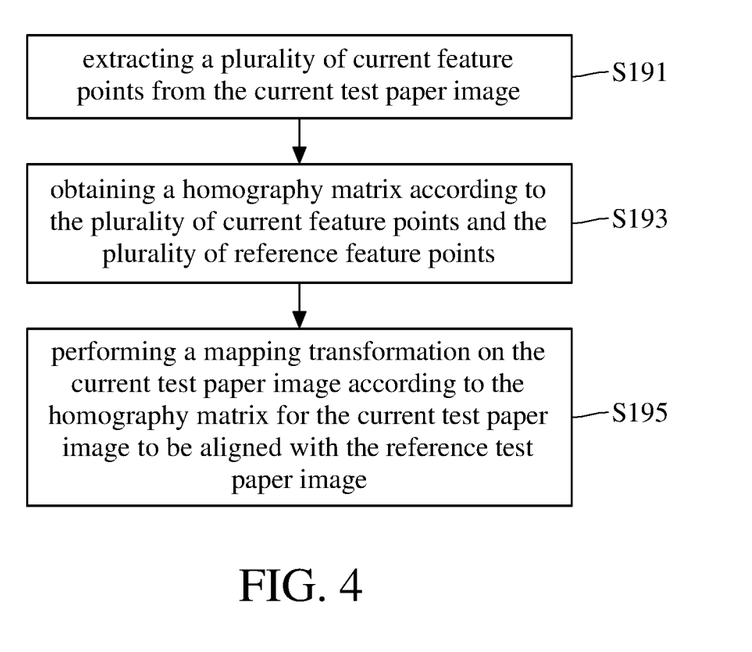
FIG. 4 is a flowchart illustrating sub-steps of step S19 in FIG. 2.

Please refer to FIG. 1 and FIG. 4, wherein FIG. 4 is a flowchart illustrating sub-steps of step S19 in FIG. 2. Specifically, as shown in 4, step S19 of aligning the current test paper image with the reference test paper image corresponding to the reference text string may include: step S191: extracting a plurality of current feature points from the current test paper image; step S193: obtaining a homography matrix according to the plurality of current feature points and the plurality of reference feature points; and step S195: performing a mapping transformation on the current test paper image according to the homography matrix for the current test paper image to be aligned with the reference test paper image.

It should be noted that, the processing device 11 may extract the reference feature points from the reference test paper image for aligning the current test paper image with the reference test paper image before performing step S19 or when performing step S19. Specifically, in an implementation, the processing device 11 may extract a plurality of feature points from the current test paper image when determining the script color on the current test paper image is the designated color in step S13, use the current test paper image as the reference test paper image, and store the feature points as the reference feature points. In another implementation, the processing device 11 may store the test paper image (used as the reference test paper image) indicating the correct answers when obtaining the test paper image, and extract the reference feature points from the stored reference test paper image while extracting the current feature points from the current test paper image (or before extracting the current feature points from the current test paper image; or after extracting the current feature points from the current test paper image).

In step S191, the processing device 11 may search the current feature points on the current test paper image that are similar to the reference feature points by Oriented FAST and Rotated BRIEF (ORB) algorithm. Then in step S193, the processing device 11 obtains the homography matrix according to the reference feature points and the current feature points, and maps the current test paper image onto the reference test paper image according to the homography matrix in step S195 for the current test paper image to be aligned with the reference test paper image. Accordingly, in the following step S21, the processing device 11 may find the location of the hand-writing script on the current test paper image in a faster way, to thereby calculating the test score in a faster way.

Figure 5:
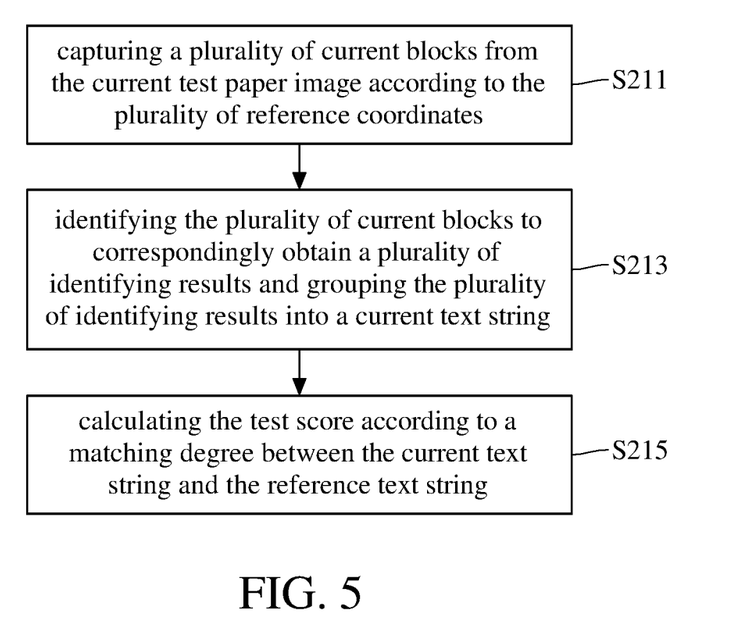
FIG. 5 is a flowchart illustrating sub-steps of step S21 in FIG. 2.
Figure 6:
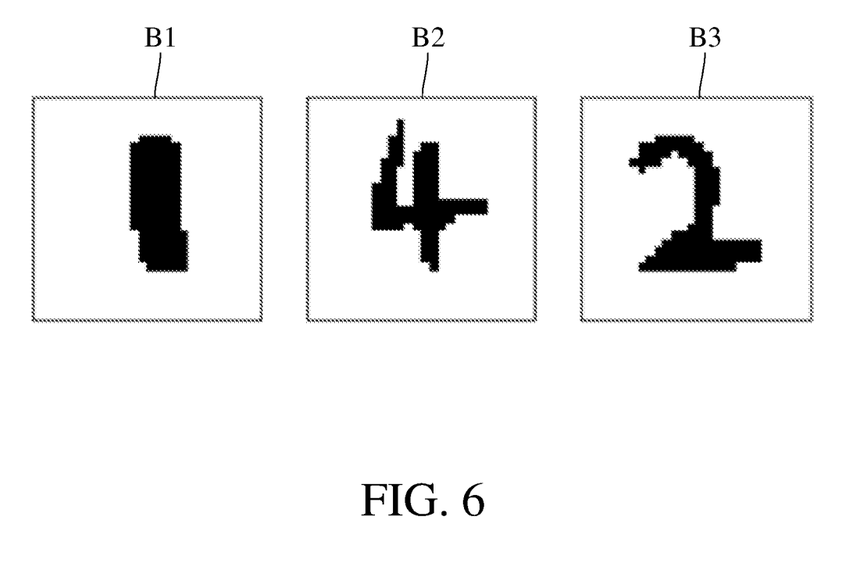
FIG. 6 is an exemplarily diagram illustrating current blocks.

To explain the method of calculating the test score in more detail, please refer to FIG. 1, FIG. 5 and FIG. 6, wherein FIG. 5 is a flowchart illustrating sub-steps of step S21 in FIG. 2, and FIG. 6 is an exemplarily diagram illustrating current blocks. It should be noted that, the current blocks B1-B3 shown in FIG. 6 are obtained from the current test paper image IMG of FIG. 3, and are illustrated based on the determination result of the current test paper image IMG in FIG. 3 not being the reference test paper image.

As shown in FIG. 5, step S21 of using the reference coordinates to compare the current test paper image with the current test paper image to output the test score may include: step S211: capturing a plurality of current blocks from the current test paper image according to the plurality of reference coordinates; step S213: identifying the plurality of current blocks to correspondingly obtain a plurality of identifying results and grouping the plurality of identifying results into a current text string; and step S215: calculating the test score according to a matching degree between the current text string and the reference text string.

In step S211, the processing device 11 captures (cuts out) the current blocks B1-B3 from the current test paper image according to the reference coordinates to obtain the current blocks B1-B3 more efficiently, wherein the current blocks B1-B3 are blocks circling the hand-writing scripts respectively, and the current blocks B1-B3 preferably have the same size, such as 28 pixels×28 pixels. In addition, when performing step S211, the processing device 11 may further center the hand-writing script at the corresponding current block. For example, the processing device 11 may center "1" in the current block B1; center "4" in the current block B2; and center "2" in the current block B3. In step S213, the processing device 11 identifies the words corresponding to the current blocks B1-B3 are 1, 4 and 2 by using the trained artificial neural network model, and records the identified words as the current text string of "1-4-2" in a serial manner. Then, in step S215, the processing device 11 may compare the current text string with the reference text string pre-stored in the database 12 to obtain the matching degree, thereby calculating the test score corresponding to the current text string. Specifically, the matching degree and the test score are positively related.

Figure 7:
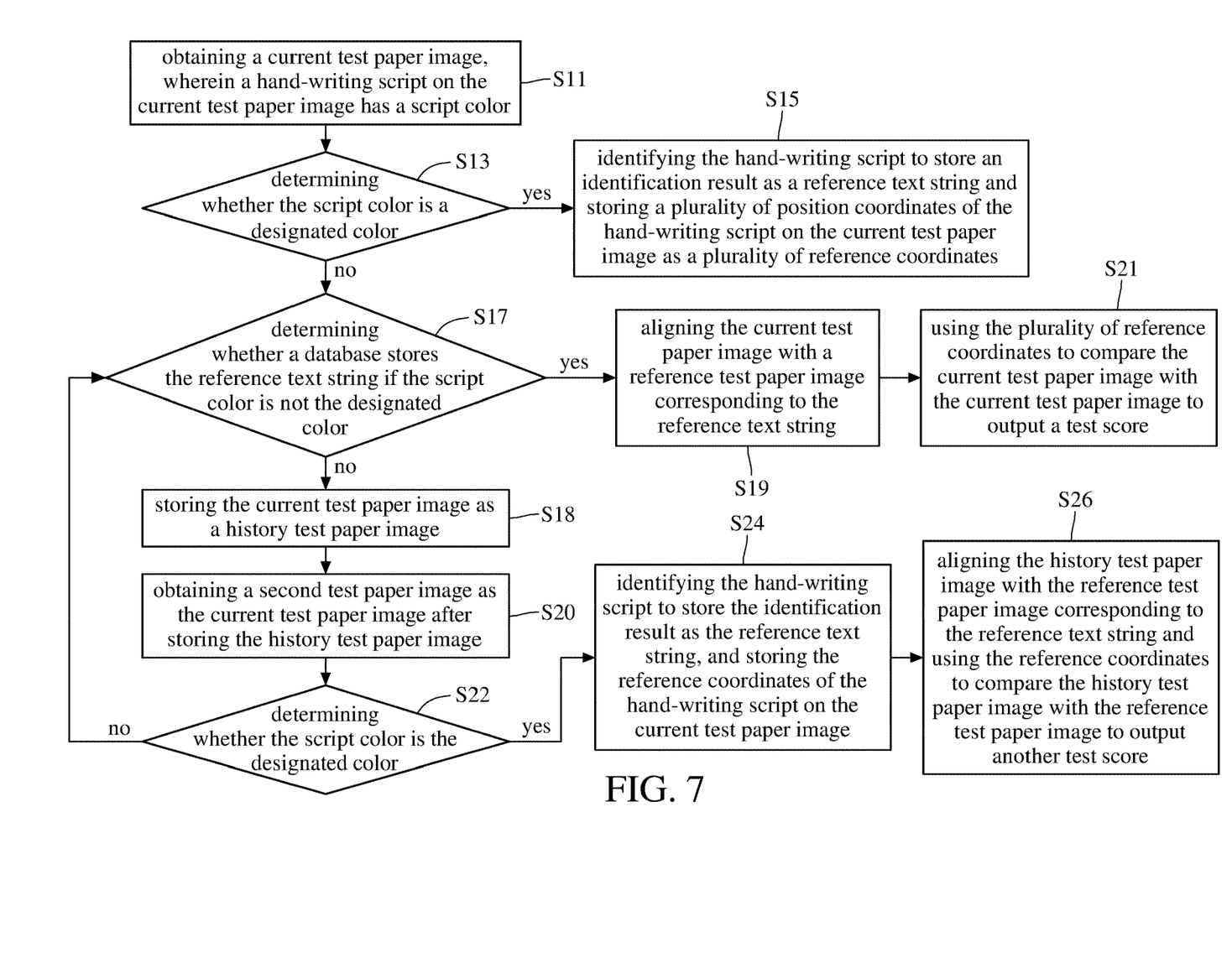
FIG. 7 is a flowchart illustrating an automatic scoring system according to another embodiment of the present disclosure.

Please refer to FIG. 1 and FIG. 7, wherein FIG. 7 is a flowchart illustrating an automatic scoring system according to another embodiment of the present disclosure. The automatic scoring method of the embodiment of FIG. 7 may include step S11 to step S26, and steps S11, S13, S15, S19 and S21 shown in FIG. 7 are the same as steps S11, S13, S15, S19 and S21 shown in FIG. 2, their descriptions are not repeated herein. The difference between FIG. 7 and FIG. 2 is that, step S23 of FIG. 2 may be omitted from the embodiment of FIG. 7, and when the determination result of step S17 is "no", the embodiment of FIG. 7 may further include performing: step S18: storing the current test paper image as a history test paper image; step S20: obtaining a second test paper image as the current test paper image after storing the history test paper image; step S22: determining whether the script color is the designated color; when the determination result of step S22 is "yes", performing step S24: identifying the hand-writing script to store the identification result as the reference text string, and storing the reference coordinates of the hand-writing script on the current test paper image; and step S26: aligning the history test paper image with the reference test paper image corresponding to the reference text string and using the reference coordinates to compare the history test paper image with the reference test paper image to output another test score; and step S22 when the determination result of step S22 is "no", performing step S17 again.

As described above, when determining that the database 12 does not store the reference text string, it means that the current test paper image is the test paper filled out by the examinee, and that the database 12 currently does not store the reference text string indicating the correct answers. Therefore, when the determination result of step S17 is "no", the processing device 11 may perform step S18 to store the current test paper image into the database 12 as the history test paper image. Therefore, when the reference text string is obtained subsequently, the processing device 11 may retrieve the history test paper image from the database 12 to calculate the test score. Then, in step S20 and step S22, the processing device 11 may obtain another test paper image (i.e. the second test paper image) from the photographing device 13 as another current test paper image, and perform the determination of whether the script color is the designated color on said another current test paper image. If the determination result of step S22 is "no", it means that the second test paper image is still not the reference test paper image having the correct answers, and the processing device 11 performs step S17 again; and if the determination result of step S22 is "yes", it means that the second test paper image have the correct answers and may be used as the reference test paper image. Then the processing device 11 performs step S24. In step S24, the processing device 11 identifies the hand-writing script of the second test paper image, stores the reference text string into the database 12 according to the identification result, and stores the reference coordinates of the hand-writing script on the second test paper image into the database 12, where the implementation of step S24 may be the same as step S15, and detail descriptions thereof are not repeated herein. Then, in step S26, the processing device 11 aligns the history test paper image stored in the database 12 with the reference test paper image corresponding to the reference text string, and uses the reference coordinates to compare the history test paper image with the reference test paper image to output another test score. The reference text string described in step S26 is the text string identified in step S24, and the reference test paper image described in step S26 is the second test paper image obtained in step S20, and the reference coordinates described in step S26 are coordinates of the hand-writing script on the second test paper image. Specifically, the processing device 11 may also align the history test paper image with the reference test paper image trough steps S191 to S195 shown in FIG. 4, and may compare the current test paper image with the reference test paper image to output the test score through steps S211 to S215 shown in FIG. 5.

In another embodiment, in addition to the embodiments described above, when the determination result of step S17 is "no", the processing device 11 may further perform both step S23 of FIG. 2 and step S18 of FIG. 7.

In view of the above description, the automatic scoring method and system according to one or more embodiments of the present disclosure may lower the costs for hardware purchase and maintenance of test scanners, and since the examinee does not need to fill out answers using additional answering sheet, the above embodiments may be more environmental friendly. In addition, the automatic scoring method and system according to one or more embodiments of the present disclosure may improve the efficiency of scoring the test papers. That is, people (such as teachers) scoring the test papers may not need to compare the answers one by one; instead, they may determine the test score in a faster way by placing the test paper in front of the photographing device (such as the photographing device 13 shown in FIG. 1) to determine the test score, and errors caused by manually scoring the test papers may be alleviated.

What is claimed is:

1. An automatic scoring method, performed by a processing device, comprising:
    obtaining a current test paper image, wherein a hand-writing script on the current test paper image has a script color;
    determining whether the script color is a designated color;
    determining whether a database stores a reference text string if the script color is not the designated color;
    aligning the current test paper image with a reference test paper image corresponding to the reference text string and using a plurality of reference coordinates to compare the current test paper image with the reference test paper image to output a test score when the database stores the reference text string; and
    identifying the hand-writing script to store an identification result as the reference text string and storing a plurality of position coordinates of the hand-writing script on the current test paper image as the plurality of reference coordinates if the script color is the designated color.

2. The automatic scoring method according to claim 1, wherein using the plurality of reference coordinates to compare the current test paper image with the reference test paper image to output the test score comprises:
    capturing a plurality of current blocks from the current test paper image according to the plurality of reference coordinates;
    identifying the plurality of current blocks to correspondingly obtain a plurality of identifying results and grouping the plurality of identifying results into a current text string; and
    calculating the test score according to a matching degree between the current text string and the reference text string.

3. The automatic scoring method according to claim 1, further comprising extracting a plurality of reference feature points from the reference test paper image, wherein aligning the current test paper image with the reference test paper image corresponding to the reference text string comprises:
    extracting a plurality of current feature points from the current test paper image;
    obtaining a homography matrix according to the plurality of current feature points and the plurality of reference feature points; and
    performing a mapping transformation on the current test paper image according to the homography matrix for the current test paper image to be aligned with the reference test paper image.

4. The automatic scoring method according to claim 1, further comprising, when the database does not store the reference text string, performing:
    storing the current test paper image as a history test paper image;

obtaining a second test paper image as the current test paper image after storing the history test paper image;

determining whether the script color is the designated color again; and aligning the history test paper image with the reference test paper image corresponding to the reference text string and using the plurality of reference coordinates to compare the history test paper image with the reference test paper image to output another test score after storing the reference text string and the plurality of reference coordinates.

5. An automatic scoring system, comprising:

a database;

a photographing device configured to capture a current test paper image and outputting the current test paper image, wherein a hand-writing script on the current test paper image has a script color; and a processing device connected to the database and the photographing device, and configured to obtain the current test paper image, determine whether the script color is a designated color, determine whether the database stores a reference text string if the script color is not the designated color, align the current test paper image with a reference test paper image corresponding to the reference text string and use a plurality of reference coordinates to compare the current test paper image with the reference test paper image to output a test score when the database stores the reference text string, and identify the hand-writing script to store an identification result as the reference text string and store a plurality of position coordinates of the hand-writing script on the current test paper image as the plurality of reference coordinates if the script color is the designated color.

6. The automatic scoring system according to claim 5, wherein the processing device performing using the plurality of reference coordinates to compare the current test paper image with the reference test paper image to output the test score comprises:

capturing a plurality of current blocks from the current test paper image according to the plurality of reference coordinates;

identifying the plurality of current blocks to correspondingly obtain a plurality of identifying results and grouping the plurality of identifying results into a current text string; and calculating the test score according to a matching degree between the current text string and the reference text string.

7. The automatic scoring system according to claim 5, wherein the processing device is further configured to extract a plurality of reference feature points from the reference test paper image, and the processing device performing aligning the current test paper image with the reference test paper image corresponding to the reference text string comprises:

extracting a plurality of current feature points from the current test paper image;

obtaining a homography matrix according to the plurality of current feature points and the plurality of reference feature points; and performing a mapping transformation on the current test paper image according to the homography matrix for the current test paper image to be aligned with the reference test paper image.

8. The automatic scoring system according to claim 5, wherein the processing device is further configured to perform:

storing the current test paper image as a history test paper image;

obtaining a second test paper image as the current test paper image after storing the history test paper image;

performing determining whether the script color is the designated color again; and aligning the history test paper image with the reference test paper image corresponding to the reference text string and using the plurality of reference coordinates to compare the history test paper image with the reference test paper image to output another test score after storing the reference text string and the plurality of reference coordinates.

\* \* \* \* \*